United States Patent [19]

Ansdale

[11] Patent Number: 4,823,743
[45] Date of Patent: Apr. 25, 1989

[54] OSCILLATING VANE MACHINE

[75] Inventor: Richard F. Ansdale, Tintern, England

[73] Assignee: Compression Technology Inc., Mechanicsburg, Pa.

[21] Appl. No.: 875,340

[22] Filed: Jun. 17, 1986

[51] Int. Cl.$^4$ .......................................... F02B 53/00
[52] U.S. Cl. ............................... 123/18 R; 123/192 B
[58] Field of Search ............. 123/18 R, 18 A, 193 R, 123/193 P, 668, 669, 192 B; 277/27, 163, 157; 29/156.4 WL

[56] References Cited

U.S. PATENT DOCUMENTS

| | | | |
|---|---|---|---|
| 1,010,583 | 2/1911 | Carmichael et al. | 123/18 R |
| 1,705,826 | 3/1929 | Polizzi | 123/18 R |
| 1,737,082 | 11/1929 | Gough | 123/18 R |
| 1,802,650 | 4/1931 | Helmlinger | 123/18 R |
| 2,053,017 | 9/1936 | Babel | 123/18 R |
| 2,257,884 | 10/1941 | Mize | 123/18 R |
| 2,393,204 | 1/1946 | Taylor | 91/223 |
| 2,793,499 | 5/1957 | Patch | 91/339 |
| 3,153,985 | 10/1964 | Riley et al. | 91/339 |
| 3,299,867 | 1/1967 | Ficsur et al. | 123/18 R |
| 3,315,648 | 4/1967 | Del Castillo | 123/18 R |
| 3,408,991 | 11/1968 | Davis | 123/18 R |
| 3,503,374 | 3/1970 | Ehrlich et al. | 123/18 R |
| 3,804,424 | 4/1974 | Gardner | 277/27 |
| 3,948,226 | 4/1976 | Green et al. | 123/18 R |
| 4,029,060 | 6/1977 | Dane | 123/18 R |
| 4,099,448 | 7/1978 | Young | 123/18 R |
| 4,106,441 | 8/1978 | Anderson | 123/18 R |
| 4,220,284 | 9/1980 | Beiswenger et al. | 91/339 |
| 4,225,294 | 9/1980 | Kakuwa et al. | 29/156.4 WL |
| 4,272,229 | 6/1981 | Pape | 123/18 R |
| 4,290,341 | 9/1981 | Scheibengraber | 123/18 R |

FOREIGN PATENT DOCUMENTS

| | | | |
|---|---|---|---|
| 338872 | 8/1904 | France | 123/18 R |
| 1593248 | 7/1970 | France | 123/668 |

Primary Examiner—Willis R. Wolfe, Jr.
Assistant Examiner—M. Macy
Attorney, Agent, or Firm—Fay, Sharpe, Beall, Fagan, Minnich & McKee

[57] ABSTRACT

An apparatus for pressurizing a fluid comprises a housing including a chamber and at least one vane positioned in the chamber and adapted to oscillate therein at any convenient speed to pressurize a fluid. A seal member is secured to the at least one vane for sealing between the at least one vane and the chamber. A propulsion apparatus is provided for oscillating the at least one vane and a counterweight device is operably secured to the propulsion apparatus. The counterweight device moves in opposition to the movement of the at least one vane to minimize the vibration produced in the housing by the oscillation of the at least one vane. A valve mechanism is secured to the housing and is in fluid communication with the chamber in the housing to control the movement of fluid into and out of the chamber.

29 Claims, 12 Drawing Sheets

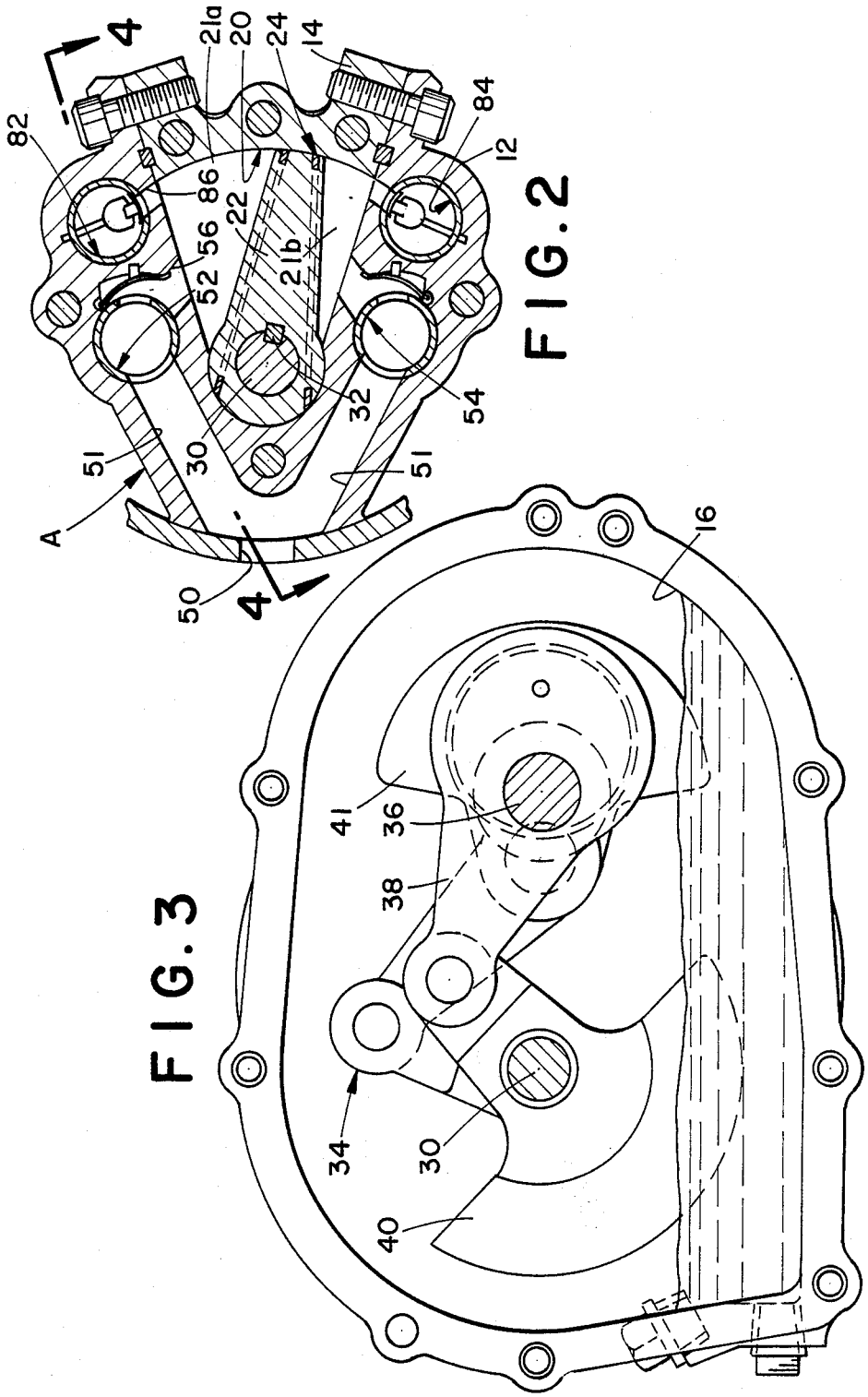

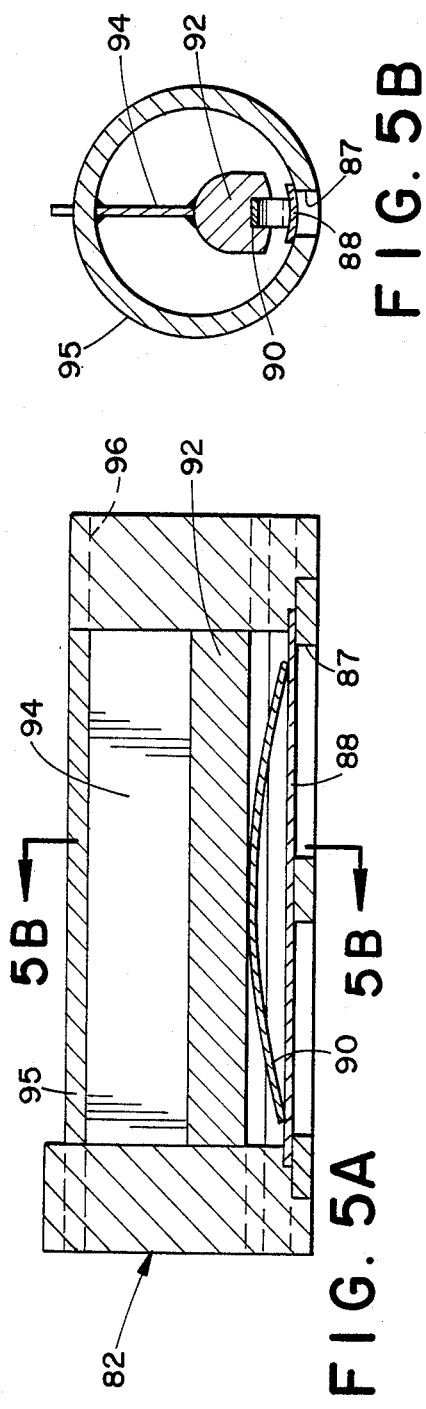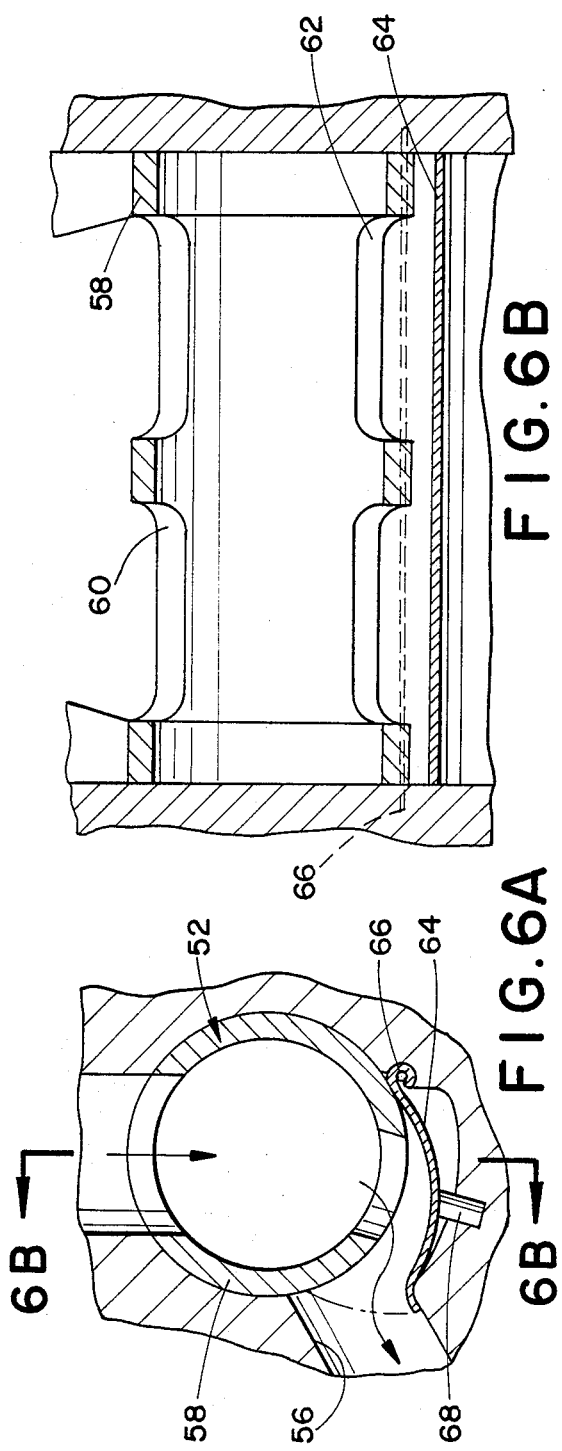

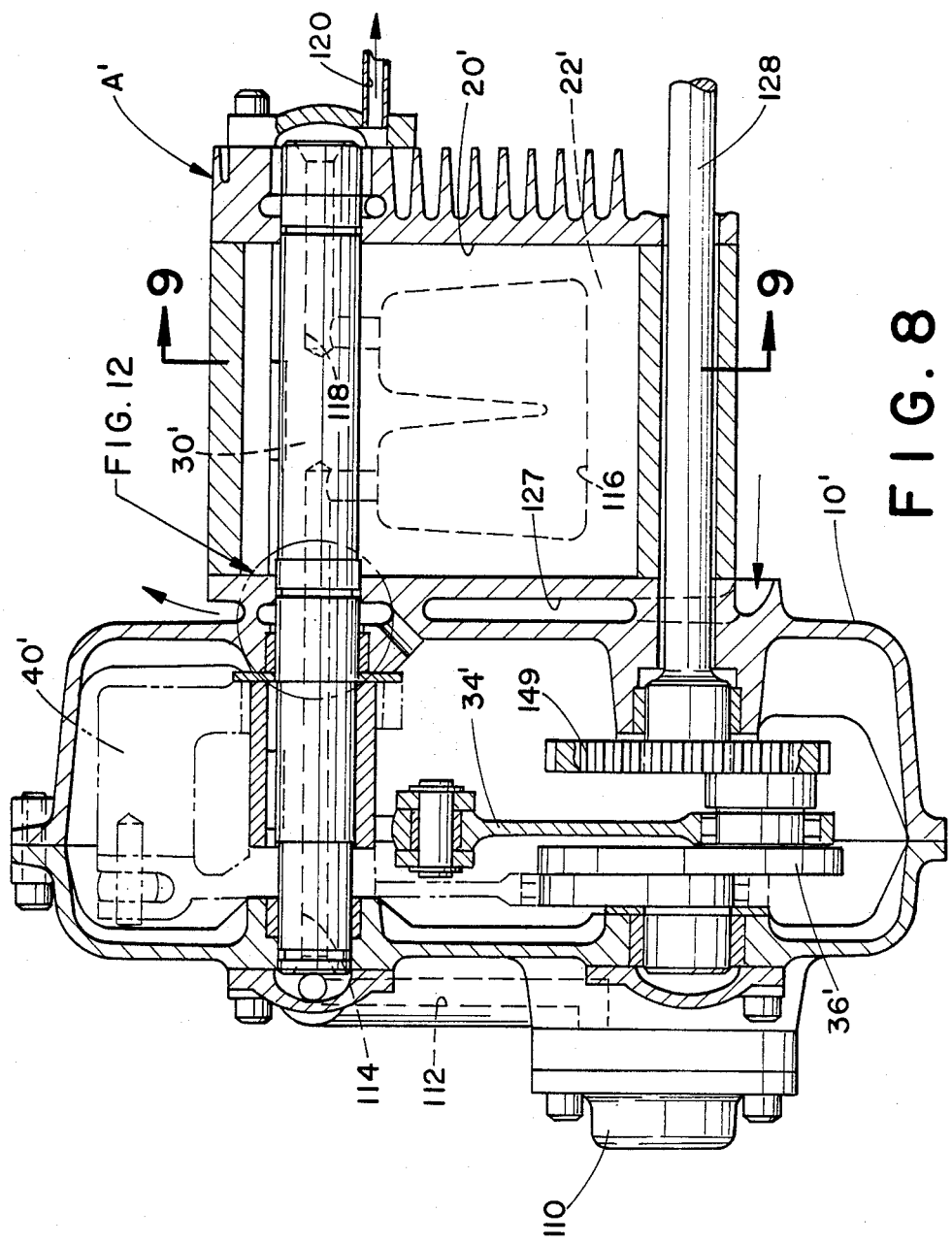

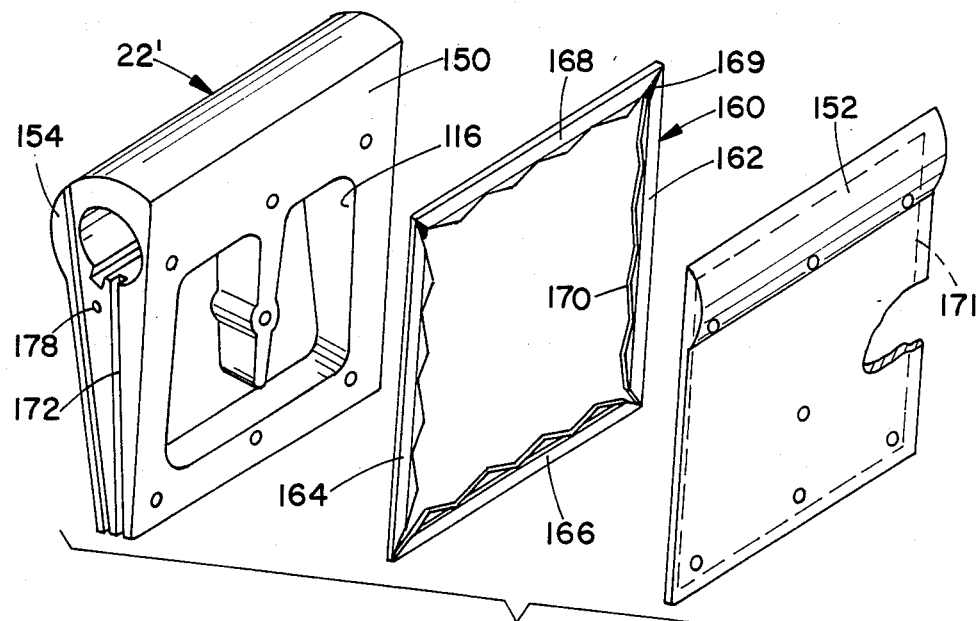
FIG.10
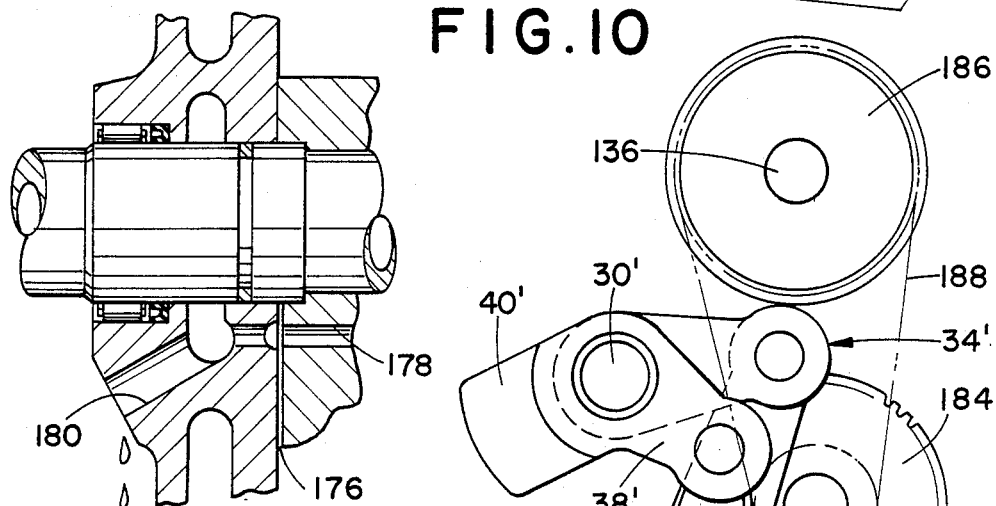
FIG.12
FIG.11

OSCILLATING VANE MACHINE

BACKGROUND OF THE INVENTION

This invention generally pertains to oscillating or reciprocating vane devices or machines. More specifically, the present invention relates to a machine which can be adapted for use either as a compressor or as an engine and in which at least one vane oscillates in a chamber.

The invention is particularly applicable to high speed compressors and internal combustion engines and will be described with particular reference thereto. However, it will be appreciated by those skilled in the art that the invention has broader applications and may also be adapted for use in any other type of compressor, engine or other device in which an oscillating vane can be employed.

A number of oscillating vane designs for engines and compressors are known to the art. All of these, however, suffer from serious drawbacks which have made them impractical for widespread commercial use. The greatest difficulties with conventional designs are in the sealing and lubrication arrangements provided for the vanes and the valving means provided for moving fluid into and out of the vane chamber. Also, conventional oscillating vane compressor and engine designs do not adequately reduce the vibrations produced by the oscillation or reciprocation of the vane, rocking shaft, rocking lever and a portion of the connecting rods. Moreover, conventional oscillating vane machine designs do not allow for the attainment of power and output speeds competitive with present day reciprocating piston engines or their equivalents.

Accordingly, it has been considered desirable to develop a new and improved oscillating vane machine which could be adapted for use either as a compressor or as an engine and which would overcome the foregoing difficulties and others while providing better and more advantageous overall results.

BRIEF SUMMARY OF THE INVENTION

In accordance with the present invention, a new and improved apparatus for pressurizing a fluid is provided.

More particularly in accordance with the invention, the apparatus comprises a housing including a chamber and at least one vane positioned in the chamber and adapted to oscillate therein at suitable speeds to pressurize the fluid. A seal means is secured to the at least one vane for sealing between the at least one vane and the chamber. Propulsion means are provided for oscillating the at least one vane. Counter-oscillating means, which are operably secured to the propulsion means, are also provided. The counter-oscillating means move in opposition to the movement of the at least one vane to minimize the vibration produced in the housing by the oscillation of the at least one vane. Valve means, which are secured to the housing and are in fluid communication with the housing chamber are also provided to control the movement of fluid into and out of the chamber.

In accordance with another aspect of the invention, an oscillating vane compressor is provided for pressurizing fluids.

In accordance with this aspect of the invention, the compressor comprises a housing having a chamber therein. A surface of the chamber is made from a low friction material. A vane is positioned in the housing chamber and is adapted to oscillate therein to pressurize the fluid. The vane is made from a low friction material so that a minimum of friction is generated as the vane oscillates in the chamber thereby obviating the need for lubrication. An inlet valve is secured to the housing for allowing selective intake of relatively unpressurized fluid into the chamber in the housing. An outlet valve is secured to the housing for allowing selective discharge of a relatively pressurized fluid from the chamber in the housing.

According to still another aspect of the invention, an apparatus is provided for pressurizing fluid.

In accordance with this aspect of the invention, the apparatus comprises a housing including a chamber and a vane which is positioned in the chamber and adapted to oscillate therein to pressurize the fluid. A sealing grid is contained in the vane and is capable of sealing against vacuum and discharge pressures. The sealing grid includes at least one apex seal and at least one pair of side seals as well as at least one base seal. Propulsion means are provided for oscillating the at least one vane. Valve means are secured to the housing and are in fluid communication with the housing chamber to control the movement of fluid into and out of the chamber.

One advantage of the present invention is the provision of a new oscillating vane machine which can be adapted to operate either as a compressor or as an engine.

Another advantage of the invention is the provision of an oscillating vane machine which is provided with a counter-oscillating means operably secured to a propulsion means and moving in opposition to the movement of the vane to reduce the magnitude of vibrations produced in the vane housing by the oscillation of the vane.

Still another advantage of the present invention is the provision of an oscillating vane machine in which care is taken to initially reduce all the oscillating and rotating masses to a minimum size, to keep down the magnitude of vibrations rather than subsequently reducing the vibrations artificially. Since power will be absorbed in the actuation of vibration reducing devices, such devices are only incorporated in the present design where they can also be utilized for other purposes, for example as counter rotating valve gearing. In keeping with this design, the radius of gyration of the vane is kept to a minimum without jeopardizing the capacity of the vanes to transmit the gas forces acting on them through the provision of an overhead camshaft configuration.

Still another advantage of the present invention is the provision of an oscillating vane device in which the inertia of the vane is lowered by making the vane from a lightweight self-lubricating material. Such a vane can cooperate with a vane chamber surface made from a hard self-lubricating material to allow the vane to oscillate therein in a completely lubricant free manner thereby eliminating the need for a lubricating system.

Yet still another advantage of the present invention is the provision of an oscillating vane machine provided with valve means in the form of rotating valves. Rotary valves are advantageous since they generate less mechanical noise than self acting valves and also provide significantly more favorable valve timing and precisely dimensioned valve opening areas thereby facilitating the use of the oscillating vane machine as a supercharger. In addition, the rotating components of the valve gearing can be made to counter-rotate which together with a counter oscillating counterweight mass would minimize vibration effects on the machine.

Still yet another advantage of the invention is the provision of an oscillating vane machine which can be either liquid cooled or air cooled as is desired for a particular application.

A yet further advantage of the invention is the provision of an oscillating vane machine in which the vane incorporates at least one complete sealing grid and separate oil seals to prevent lubricant from leaking from the rocking shaft bearings into the chamber in which the vane member oscillates. The sealing grid can be accommodated in suitable slots provided around the periphery of the vane. Preferably, two complete sealing grids are provided on the vane and the section of the vane between the sealing grids is vented into the crankcase to insure the creation of a pressure gradient across the sealing areas.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangments of parts preferred and alternate embodiments of which will be described in detail in this specification and illustrated in the accompaning drawings which form a part hereof and wherein:

FIG. 2 is a side elevational view in cross section of the oscillating vane machine of FIG. 1 along line 2—2;

FIG. 3 is an end elevational view of the oscillating vane machine of FIG. 1 from a first or driving end;

FIG. 5A is an enlarged side elevational view in cross section of an outlet valve of FIG. 2;

FIG. 5B is a cross sectional view of the outlet valve of FIG. 5A along the line 5B—5B;

FIG. 6A is an enlarged end elevational view in cross section of an inlet valve of the oscillating vane machine of FIG. 2;

FIG. 6B is a cross sectional view along line 6B—6B of the inlet valve of FIG. 6A;

FIG. 8 is a cross sectional view of an oscillating vane machine usable as an engine according to an alternate embodiment of the present invention;

FIG. 10 is an enlarged exploded perspective view of a vane portion of the oscillating vane machine of FIG. 8;

FIG. 11 is a schematic view of the driving mechanism of the oscillating vane machine of FIG. 8;

FIG. 12 is a greatly enlarged cross sectional view of a portion of the oscillating vane machine of FIG. 8;

DETAILED DESCRIPTION OF THE PREFERRED AND ALTERNATE EMBODIMENTS

Figure 1:
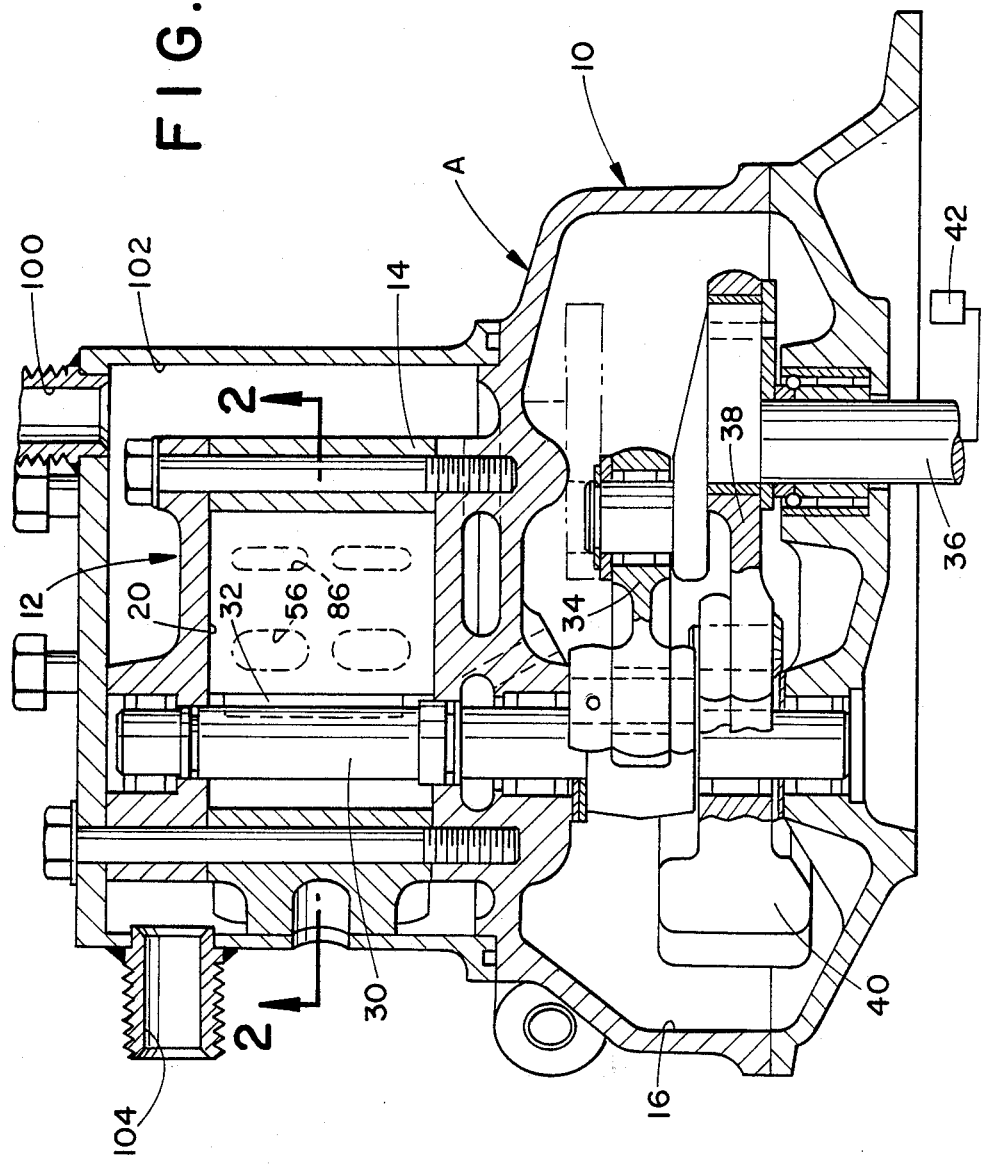
FIG. 1 is a top plane view in cross section of a first preferred embodiment of the oscillating vane machine according the present invention.

Referring now to the drawings wherein the showings are for purposes of illustrating preferred and alternate embodiments of the invention only and not for purposes of limiting same, FIG. 1 shows the first preferred embodiment of the subject new oscillating vane machine A. While the oscillating vane machine is primarily designed for and will hereinafter be described as either a compressor or an internal combustion engine, it will be appreciated that the overall inventive concept involved could be adapted for use in many other machine environments as well, such as expanders and pumps.

More particularly, the apparatus A includes a housing means 10 having therein a vane housing means 12, including a housing end member 14, and an oil storage area 16, as illustrated in FIG. 3. With reference now also to FIG. 2, a chamber 20 is formed within the vane housing means 12 and is separated into two chamber sections 21a and 21b by a vane 22 which is adapted to oscillate in the chamber. Secured to the vane is a seal means 24 for sealing between the vane and the chamber 20 thus separating the two chambers 21a and 21b from each other.

A shaft 30 is provided for driving the vane 22 with the shaft being keyed to the vane such as at 32. With reference now also to FIG. 3, a link means 34 is provided for connecting the shaft 30, which can be called a rocker shaft, to a propulsion means in the form of a crankshaft 36. A counterweight means can be operably secured to the crankshaft to reduce the amplitude of vibrations produced. The counterweight means can include a counterweight link 38 and a counterweight member 40 pivotally secured thereto and also freely pivotable around the shaft 30. The counterweight means moves in opposition to the movement of the vane 22 to minimize the vibration produced in the housing 10 by the oscillation of the vane 22. A crankshaft balance mass 41 can also be provided on the crankshaft 36 to supress vibration effects. A suitable conventional motor 42 (illustrated schematically in FIG. 1) can be provided for driving the crankshaft 36.

With reference again to FIG. 2, a relatively unpressurized fluid, such as air, is allowed into the apparatus A through an inlet orifice 50, a pair of inlet passages 51 and first and second inlet valves 52, 54 which are fixedly secured in the vane housing 12. Since the valves are identical, only the first valve 52 will be described in detail herein, it being understood that the second valve has identical components and features. With reference now also to FIG. 6A, the inlet valve 52 guides the relatively unpressurized fluid to an inlet opening 56 leading into the chamber 20. The inlet valve 52 includes a body portion 58 having therein a pair of inlet apertures 60 and a pair of outlet apertures 62. The outlet apertures can be closed by a flap 64 which is pivotable around a pivot pin 66 and moves as dictated by fluid pressure. A spring member 68, which can be made out of a resilient material, can be provided to assist in closing and to cushion the flap 64 and lessen noise as the flap is pivoted into its open position.

Also secured in the vane housing 12 are a pair of hollow substantially cylindrical outlet valves 82, 84. Two inlet and outlet valves 52, 54 and 82, 84 are shown in this embodiment since the vane machine is a double acting vaned compressor which compresses fluid with each movement of the vane. It would, however, be conceivable to construct a single acting vaned compressor having only one inlet valve and one outlet valve if that were thought desirable. Since the two valves are identical, only the first valve 82 will be discussed, it being appreciated that the second valve 84 has identical components. An outlet aperture 86 leads from the valve chamber 20 to the outlet valve 82 so that the valve can be in fluid communication with the chamber.

Figure 4:
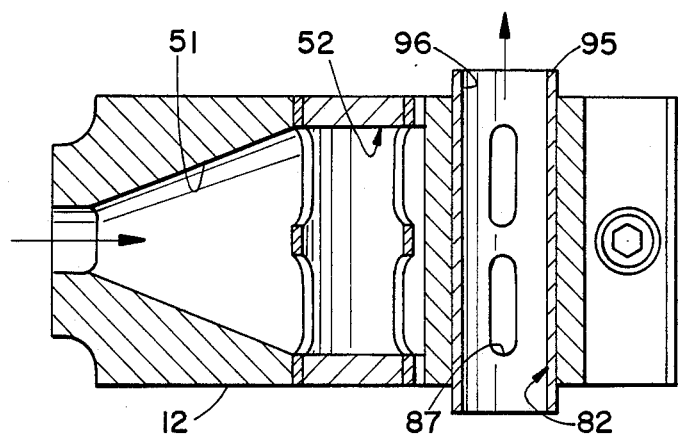
FIG. 4 is a cross sectional view along line 4—4 of FIG. 2.

With reference now to FIG. 5B, the valve 82 includes a valve orifice 87 and a valve closing plate 88, a spring 90, a backing abutment 92 for the spring, and a support rib 94 for the abutment 92 all housed in a valve body 95. When a fluid is pressurized by the vane 22, the pressurized fluid acts in opposition to the force of the spring 90 or receiver pressure and urges the plate 88 away from the valve orifice 87 thus allowing pressurized fluid into the outlet valve 82. The pressurized fluid then flows out an exit aperture 96 provided on one end of the valve (see FIG. 4). The tubular inlet and outlet valves 52, 54 and 82, 84 can be shrunk into position in the vane housing 12.

Figure 7:
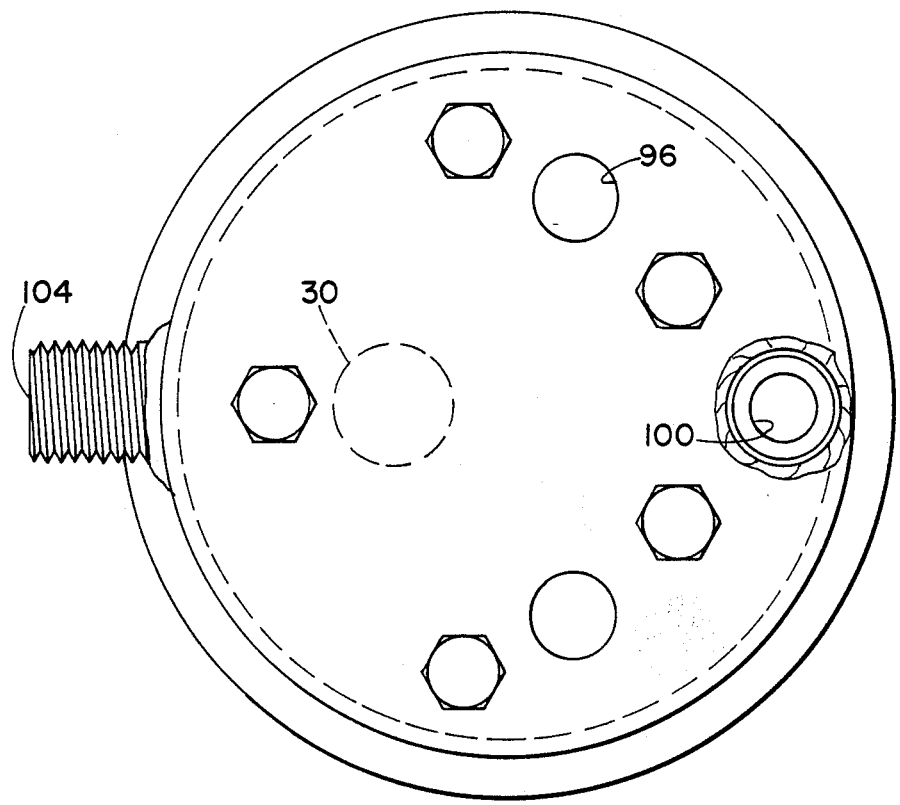
FIG. 7 is an end elevational view of the oscillating vane machine of FIG. 1 from a second end.

With reference again to FIG. 1, the housing means 10 also has provided therein a coolant means including an inlet orifice 100, a cooling chamber 102, and a coolant outlet orifice 104. Such a coolant means enables the vane housing means 12 in which the vane 22 reciprocates or oscillates to be effectively cooled during operation. As shown in FIG. 7, the coolant inlet and outlet orifices are positioned adjacent the end of the machine at which the pressurized fluid exits from the outlet orifice 96 of the outlet valve 82.

The oscillating vane machine of FIGS. 1-7 can be used as a refrigerant compressor or the like. The coolant circulating through the cooling chamber 102 can be a liquid such as water, oil or a refrigerant.

With reference now to the embodiment of FIG. 8, the invention is there shown as being used in a combined oscillating vane engine/compressor. In other words, an engine is provided on one side of the vane device and drives a compressor provided on the other side of the vane device. This engine/compressor device is light in weight and serves as a very compact yet efficient compressor. For ease of illustration and appreciation of this alternative, like components are identified by like numerals with a primed (') suffix, and new components are identified by new numerals.

In this FIGURE, an apparatus A' includes a housing means 10' having therein a chamber 20' in which a vane 22' can oscillate and turn a shaft 30'. In this embodiment the vane is cooled by a coolant medium, such as a cooling oil pumped by an oil pump 110 which enters the housing means 10' through an inlet pipe 112. The coolant can circulate through a first coolant bore 114 in a rocking shaft 30' of the vane engine. The coolant bore 114 leads to a coolant cavity 116 in the vane 22'. A second coolant bore 118 extends through the remainder of the rocking shaft 30' and is in fluid communication with the cavity 114. The coolant fluid subsequently exits the housing means 10' at a coolant outlet aperture 120.

Figure 9:
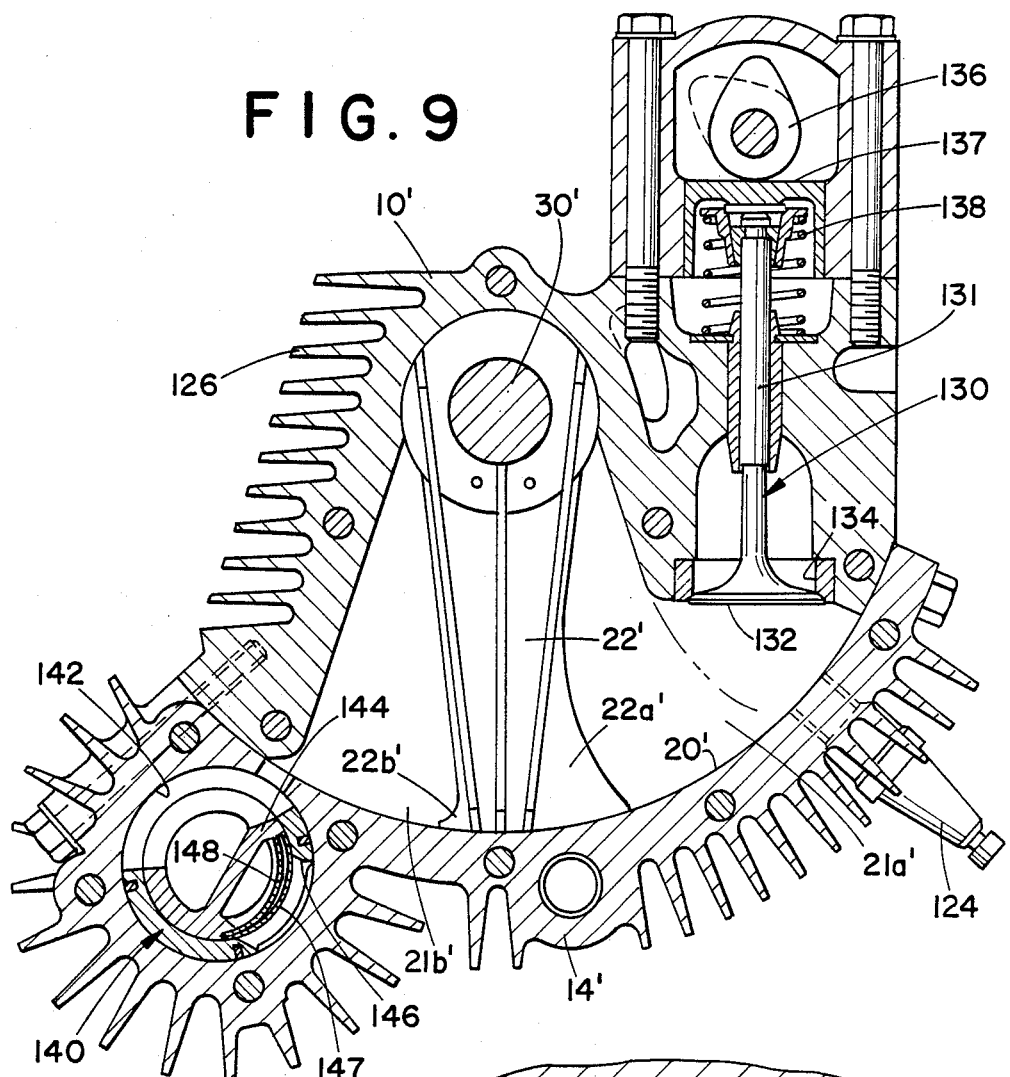
FIG. 9 is a cross sectional view along line 9—9 of the oscillating vane machine of FIG. 8.

With reference now to FIG. 9, a spark plug 124 is shown as extending into the chamber 21a' of the apparatus A' to allow this side of the vane device to be used as an engine (four stroke). A right hand flank 22a' of the vane 22', which faces into chamber 21a', is proportioned to ensure the required volume compression ratio and is shaped for adequate gas flow, turbulence and combustion phenomena. A left hand flank 22b' of the vane 22' faces into chamber 21b' which constitutes a compressor. The left hand flank 22b' constitutes a small nose along the bottom of the vane and simply minimizes the clearance volume therein by providing high volumetric efficiency.

The housing 10' and an arcuate closing plate 14' therefor are liberally provided with a plurality of cooling fins 126 to cool the device. Also, as illustrated in FIG. 8, additional fins 126 are provided on the end plate of the housing means 10'. Air is also directed to flow through a gap 127 between the opposing end plate of the device and the crankcase containing the crankshaft and the oscillating mechanism.

Since the oscillating vane machine operates as a combined engine/compressor, a crankshaft extension 128 (FIGS. 8 and 11) is provided for driving a cooling fan and a distributor (not shown). Crankshaft rotation is affected by the connecting rod which is linked to the rocking lever (and to the lever of the counter-oscillating mass 40'). In this embodiment, the crankshaft is designed to transmit no more power than is required for actuating the counter-oscillating mass and driving the cooling fan and the distributor drive.

A different type of valve means 130 is utilized in this embodiment as an inlet and outlet valve for the apparatus A'. The valve means 130 can be the familiar poppet valve which includes a cylindrical stem 131 having a mushroom head 132 selectively sealing a bore 134. The cylindrical stem 131 is actuated by a cam-shaft 136 which urges a rocker arm 137 against the force of a spring member 138 to open the valve and allow fluid into the chamber 20' at a location adjacent the spark plug 124. An identical second valve means (not illustrated) is positioned directly behind the valve means 130 and serves as the outlet valve for the right hand or engine chamber section 21a' of the device. The camshaft 136 also actuates the second valve means in the described conventional manner.

A rotary inlet and outlet valve 140 for the left hand or compressor chamber section 21b' is positioned in closing plate 14' in a bore 142 at the opposite end of the chamber 20' from the poppet valves. The rotary inlet and outlet valve 140 can incorporate an inlet section 144 which is in communication with the chamber 20' while the fluid is being pressurized by the vane 22'. The valve also includes a discharge section 146 which is rotated around to bring it into fluid communication with the chamber 20' when the pressurized fluid therein is meant to be exhausted. The discharge section has therein a valve element 147 which can be in the form of a curved plate section pivoted about one end. The valve is self acting and the element 147 closes the valve as a result of centrifugal force due to valve rotation and as a result of discharge fluid receiver back pressure. The discharge section valve element can, however, be pivoted inwardly into contact with a fixed valve element 148 by fluid pressure in the chamber 20' to open the passage in the rotary valve 140 and permit the exhaust of the pressurized fluid therethrough.

With reference again to FIG. 8, a gear member 149 is geared to the crankshaft extension 128 to drive the rotary valve 140. Further description of this type of rotary valve will be given hereinbelow in connection with FIGS. 14-16.

With reference now to FIG. 10, the vane member 22' is comprised of a central vane body 150, having therein the cooling cavity 116 as well as a pair of side vane members 152, 154. Located between each of the side vane members and the vane body is a sealing grid structure 160 of the seal means 24'. Since the two sealing grids are identical, only the right sealing grid structure 160 is illustrated and will be discussed in the specification, it being appreciated that the other sealing grid has the identical components. The sealing grid 160 includes first and second side seal elements 162, 164 as well as first and second end seal elements 166, 168 which together form a rectangular sealing grid configuration. The corners of the four elements can be filled with a suitable heat resistant sealing compound 169, if desired.

Figure 10A:
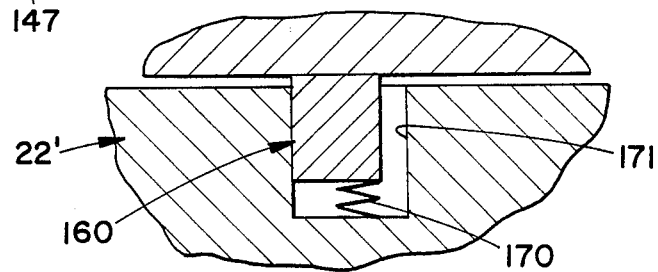
FIG. 10A is a greatly enlarged cross-sectional view of a portion of the vane of FIG. 10 together with a sealing means and a vane chamber wall.

A spring means 170, which can be in the form of a flat strip bent into corrugations, can be provided for each of the seal elements 162, 164, 166, 168 to urge the elements outwardly into sealing contact with the walls of the chamber 20'. The sealing grid 160 and the spring 170 are positioned in slots 171, provided along the periphery of the side vane member 152. Fluid pressure is also relied on to press the seal elements 162, 164, 166, 168 against the sides of the slots accommodating them. In this way, complete sealing is provided between the sealing grid 160 and the vane 22' as well as between the sealing grid and the chamber 20' as is illustrated in FIG. 10A. As mentioned, two complete such sealing grids are preferably provided one between each of the side vane members 152, 154 and the central body 150.

If desired, a central groove 172 can be machined into the vane body 150. The central groove can be provided with a partial seal member (not illustrated) to further seal between the vane 22 and the vane chamber. The partial seal ensures a greater pressure gradient across the vane 22'. This is desirable for high pressure compressors and for engines.

A pressure differential exists between the two sides of the vane 22', i.e. between the two sealing grids 160. Any excess oil in the chamber 22' can collect between the two seal structures 160 in an inter-seal space 176 from where it is efficiently funneled back to the chamber 16' through the apertures 178, 180 shown in FIG. 12. The aperture 178 extends longitudinally through the vane body 150 to equalize the pressure at both ends and communicates with the aperture 180 which extends in the body means 10'.

While the sealing grid 160 is fully illustrated only in connection with the vane 22' of the alternative embodiment of FIGS. 8-12, it is intended to be used as the preferred sealing means with all of the embodiments illustrated herein.

FIG. 11 discloses the preferred gearing arrangement for the mechanism A'. The gearing arrangement includes the vane shaft 30' around which the counterweight 40' pivots. The counterweight is pivoted by means of a rocking link 38'. Connected to the shaft 30' is a link means 34' which drives the crankshaft 128 through a gear means 182. Operably connected to the cranking gear means is the gear 149, which rotates the rotary valve 140, and an idler gear 184. This latter gear drives a camshaft wheel 186 through a conventional drive chain or belt means 188 to rotate the camshaft 136.

Figure 13:
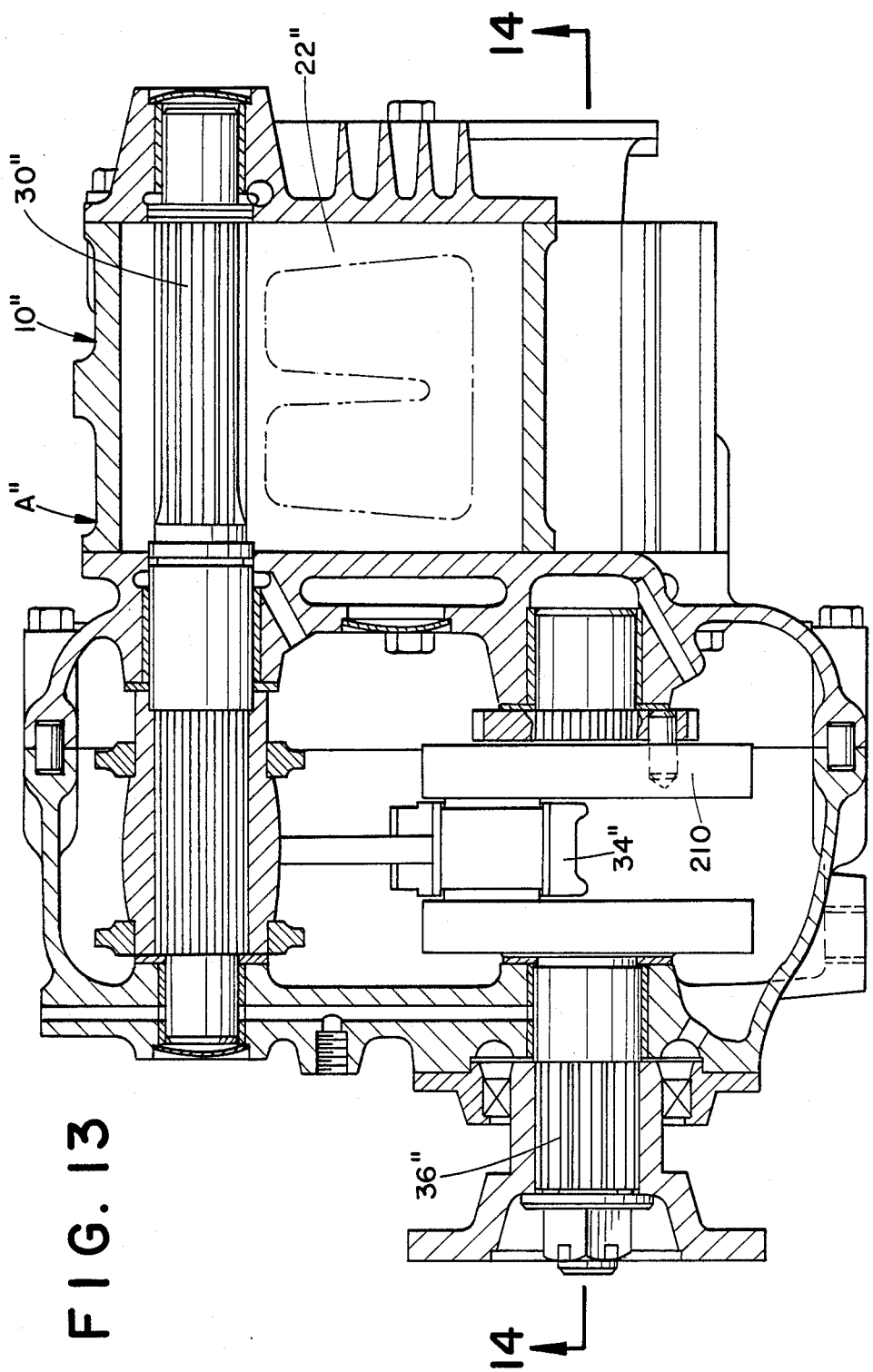
FIG. 13 is a top plane view in cross-section of an oscillating vane machine according to a second preferred embodiment of the present invention.

With reference now to the second preferred embodiment of FIG. 13, yet a another vaned compressor is shown therein. For ease of illustration and appreciation of this alternative, like components are identified by like numerals with a double primed (") suffix and new components are identified by new numerals.

Figure 14:
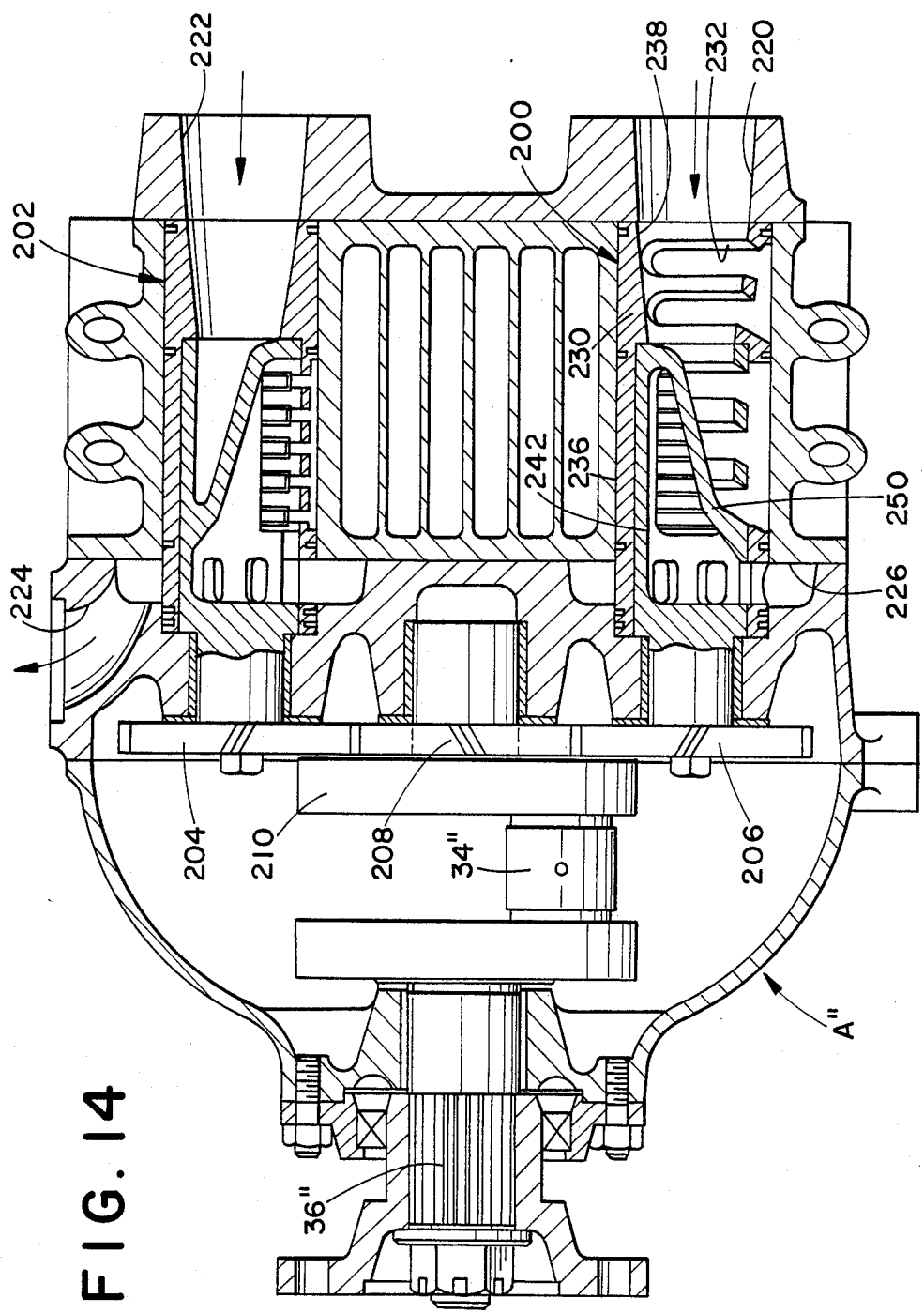
FIG. 14 is a side elevational view in cross-section of the oscillating vane machine of FIG. 13 along line 14—14 illustrating the use of rotary valves.

In this FIGURE, a vaned compressor A" has a vane member 22" secured on a shaft 30" in a housing means 10". With reference now also to FIG. 14, the compressor A" is shown as utilizing a pair of rotary inlet and outlet valves 200, 202. The rotary valves are rotated through gears 204, 206 which are operatively connected to the gear assembly which actuates the rocking or oscillation of the shaft 30". A center gear 208 is rigidly attached to a section 210 of the crankshaft 36" and rotates the two valve gears 204, 206.

Each of the valves 200, 202 is provided with a respective inlet opening 220, 222 to receive a relatively unpressurized fluid and one common outlet opening 224 is provided for removal of the pressurized fluid from the compressor. In order to accomplish this, the first inlet and outlet valve 200 is provided with an exhaust bore 226 which extends in the housing means 10' from an exhaust portion of the first valve 200 to an exhaust portion of the second valve 202 and thence to the outlet opening 224 in the body means 10'.

Figures 15A, 15B:
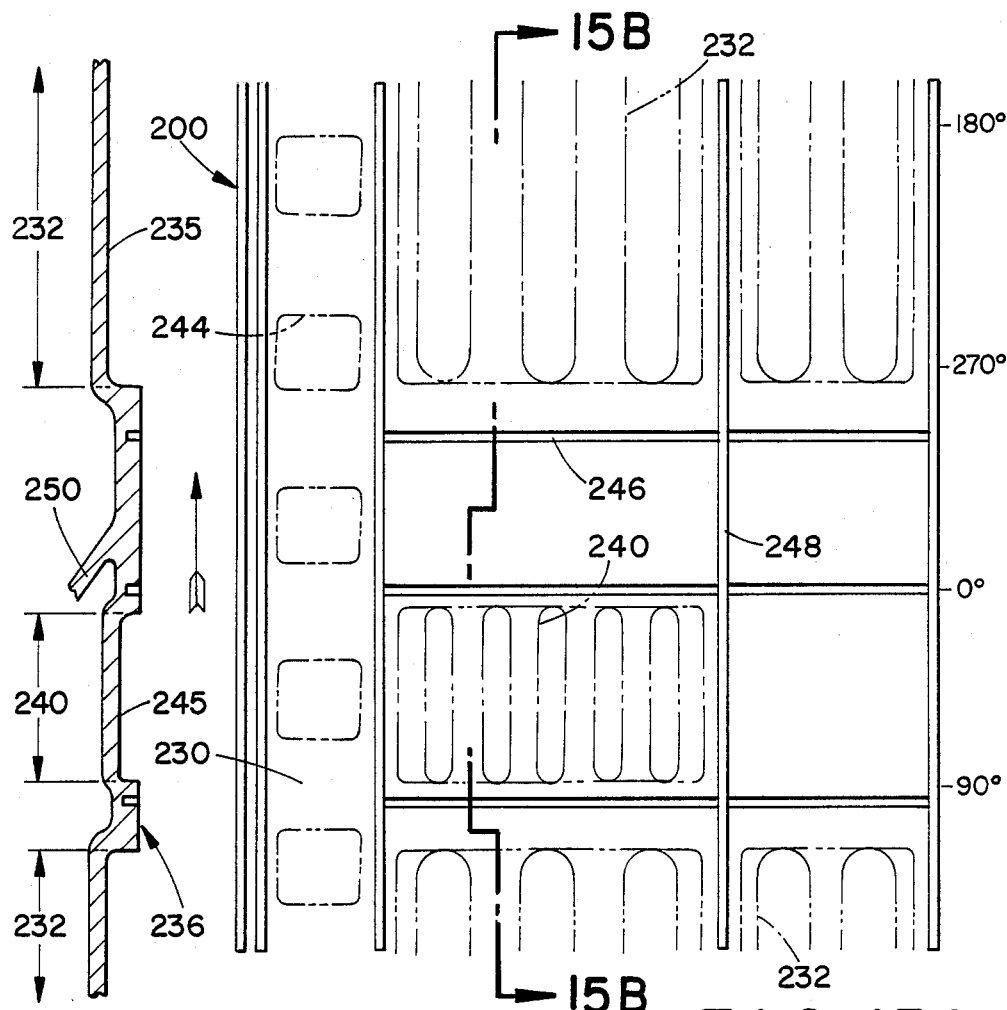
FIG. 15A is a developed view of the peripheral surface of a rotary valve of FIG. 14.
FIG. 15B is a cross-sectional view of FIG. 15 along line 15B—15B.

The two rotary valves 200, 202 are identical (and can be identical with the valve 140 illustrated in cross-section in FIG. 9) and therefore, only the first of them will be described in detail, it being appreciated that the other valve has identical components. With reference now also to the developed view of the rotary valve illustrated in FIG. 15A, the valve 200 is provided with a hollow cylindrical valve body 230 in which extend a plurality of spaced, parallel inlet orifices 232. As shown in FIG. 15B, these orifices 232 are located on a given indented section 235 of the valve body periphery 236. In this way, as is illustrated in FIG. 14, a fluid, such as air, can be received into the valve 200 and, as the valve rotates, can be exhausted into the chamber 20".

Simultaneously with the oscillation of the vane 22", and as the fluid is pressurized thereby, the valve 230 rotates and a plurality of spaced parallel outlet orifices 240 therein, which are circumferentially and axially spaced from the inlet orifices 232 are exposed to the chamber 20" so that the pressurized fluid contained in the chamber can be exhausted therethrough into an outlet bore 242 in the valve body 230. This pressurized fluid is then removed from the valve body through a plurality of second exhaust orifices 244 which guide the pressurized fluid into the exhaust bore 226. As shown in FIG. 15B, the outlet orifices are also located in an indented section 245 of the valve body periphery 236.

If desired, the valve 200 can be provided with pivotable and fixed elements (such as elements 147 and 148 illustrated in FIG. 9) to seal over the outlet orifices 240.

A plurality of longitudinal and transverse seal strips 246, 248 are provided on the exterior periphery of the rotary valve body 230 in order to seal the various orifices and apertures from each other. Inside the hollow body, is a transverse wall 250, as is evident from FIG. 15B, which separates the inlet bore 238 from the outlet bore 242 to prevent communication between the inlet orifice 232 and the outlet orifices 240 and 244.

Figure 16:
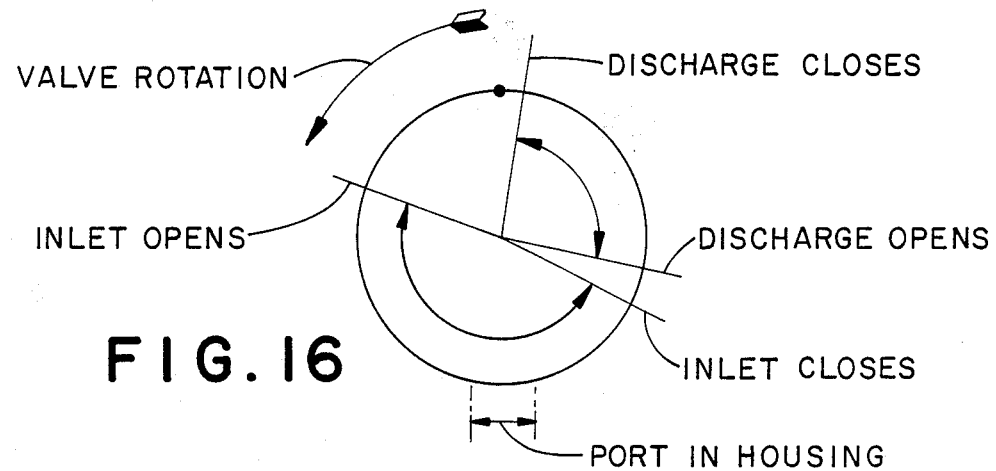
FIG. 16 is a timing diagram of a rotary valve of FIG. 14.

As shown in the timing diagram of FIG. 16, the operation of the valve is fairly straightforward in that the inlet orifices 232 are exposed and unpressurized fluid is admitted through the inlet opening 220 and the inlet orifices 232 into the chamber 20''. The valve, which is illustrated from the left end of the valve of FIG. 15A, (i.e. looking down the valve from the outlet orifices 244) can, if desired, have the inlet openings 232 stay open for up to approximately 145° of revolution of the rotary valve and the outlet opening can be open for approximately 95° of revolution. Of course, the valve opening and closing angles may vary from those listed above as requirements dictate.

The two valves 200, 202 are designed to counterrotate to minimize vibration effects in the compressor A''. Another advantage of rotary valves is that they reduce the noises caused by valve action as compared with, for example, poppet valves (i.e. piston slap).

Figure 17A:
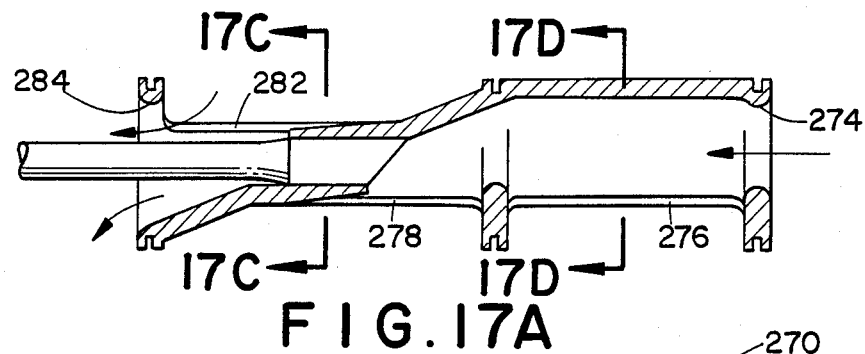
FIG. 17A is a side elevational view in cross section of a rotary valve according to an alternate embodiment.
Figure 17B:
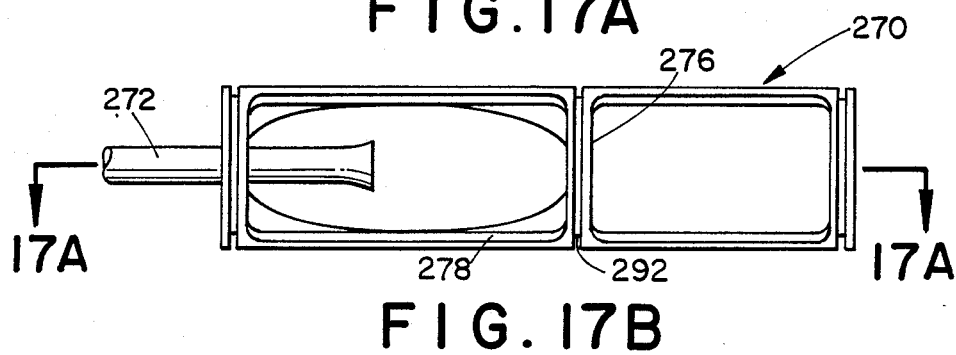
FIG. 17B is a bottom plan view of the rotary valve of FIG. 17A.

With reference now to the alternate embodiment of FIG. 17A, another type of rotary valve, which is designed for a high speed oscillating vane, is there illustrated. For ease of illustration and appreciation of this alternative, like components are identified by like numerals with a triple primed (''') suffix and new components are identified by new numerals.

Figure 17C:
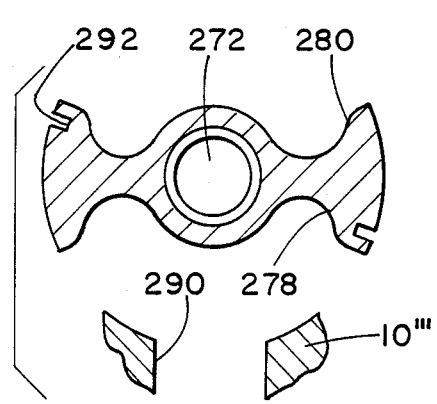
FIG. 17C is a cross sectional view of the rotary valve of FIG. 17A along line 17C—17C.
Figure 17D:
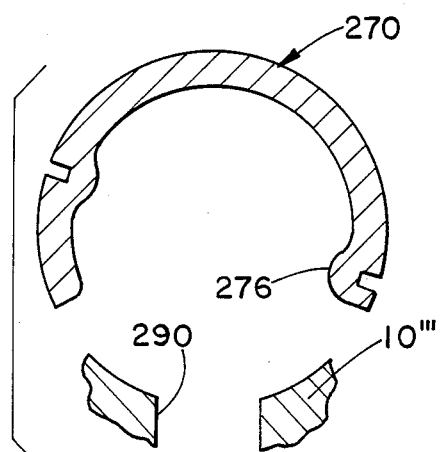
FIG. 17D is a cross sectional view of the rotary valve of FIG. 17A along line 17D—17D.

The valve of FIG. 17A is designed for use in a high speed oscillating vane supercharger which, in one embodiment, can develop 30+ PSIa and run up to approximately 6000 rev/min. In FIGS. 17A and B, it can be seen that the valve includes a substantially cylindrical hollow valve body 270, a valve drive shaft 272 extending out one end of the body, and a plurality of apertures for the intake and exhaust of fluid. The apertures include an induction aperture 274 and a pair of intake ports 276, 278 which guide the fluid into the vane chamber. Separated from the intake ports by a transverse wall 280 is a discharge port 282. Communicating with the discharge port is a discharge aperture 284 which allows the compressed fluid out of the valve. The inlet and outlet apertures 276, 278 and 282 communicate with a port 290 (FIG. 17C) which leads to the vane chamber provided in the housing means 10'''.

If needed, the valve body 270 can be provided with a plurality of grooves 292 which can house conventional seal strips (not illustrated) in the form of a complete sealing grid to seal the various inlet and discharge ports from each other. Under certain circumstances, such a sealing grid may, however, be dispensed with by a careful selection of valve and compressor body materials.

Such a valve, can be used in a small size supercharger which could be adapted to supercharge, for example, each cylinder of a four-stroke four cylinder engine with the compressor, crankshaft and the valves all rotating at engine speed. Synchronization of the engine and supercharger valve timing should result in superior engine response and performance over the entire engine speed range which is a feature unattainable by conventional turbocharging.

Figure 17E:
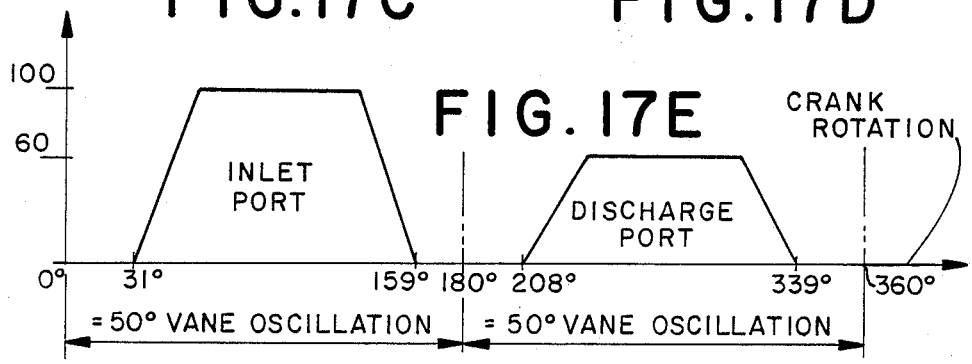
FIG. 17E is a port timing diagram indicating valve opening versus crankshaft rotation angles.

As illustrated in FIG. 17E, in one embodiment the inlet ports can open at approximately 31° of crankshaft rotation (31° a.t.d.c.) and can close at approximately 159° (159° a.t.d.c.). The discharge port can open at approximately 208° (28° a.b.d.c.) and close at approximately 339° (159° a.b.d.c.). Of course other valve opening and closing angles can also be used as requirements dictate. The specific dimensions of the valve as well as the precise port opening and closing angles can vary as may be required for any particular application. It should be noted that with such angles of opening and closing both valves will be open over the greater part of their respective periods. This fact, together with the large port opening areas provided facilitates the use of the valves at high r.p.m.'s.

Figure 18:
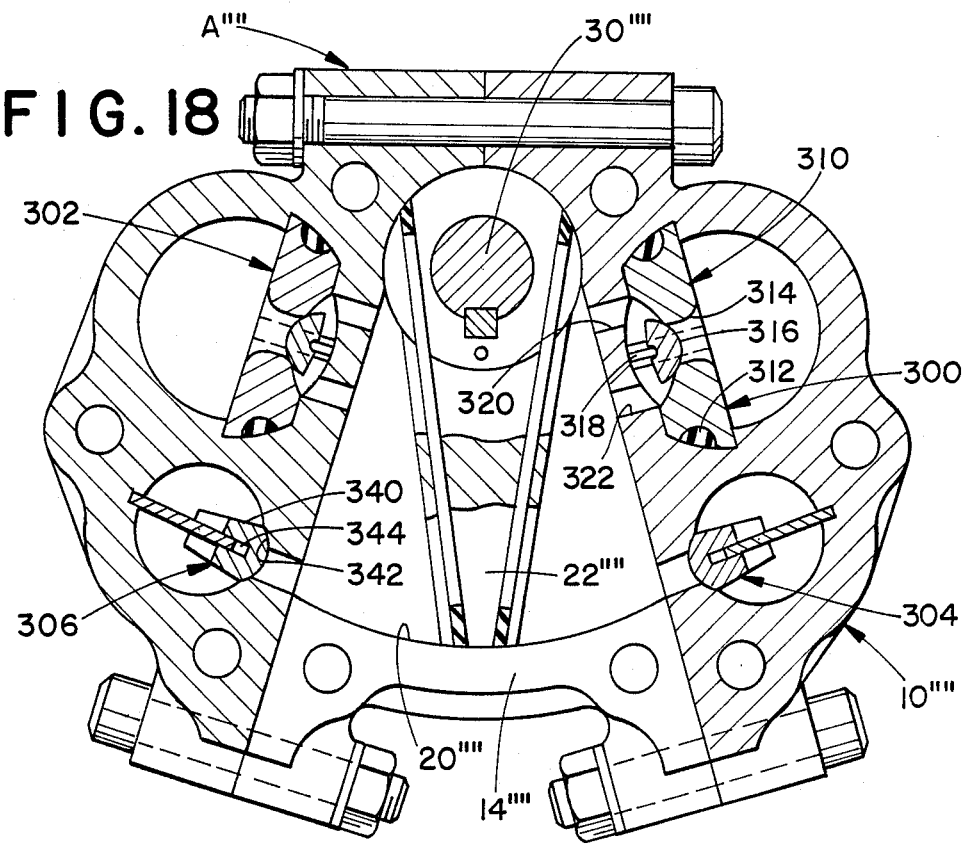
FIG. 18 is a cross sectional view of a third preferred embodiment of an oscillating vane machine according to the present invention; and, FIG. 19 is a reduced end elevational view of the oscillating vane machine of FIG. 18 illustrating the inlet and outlet ports of the valves shown in FIG. 18.
Figure 19:
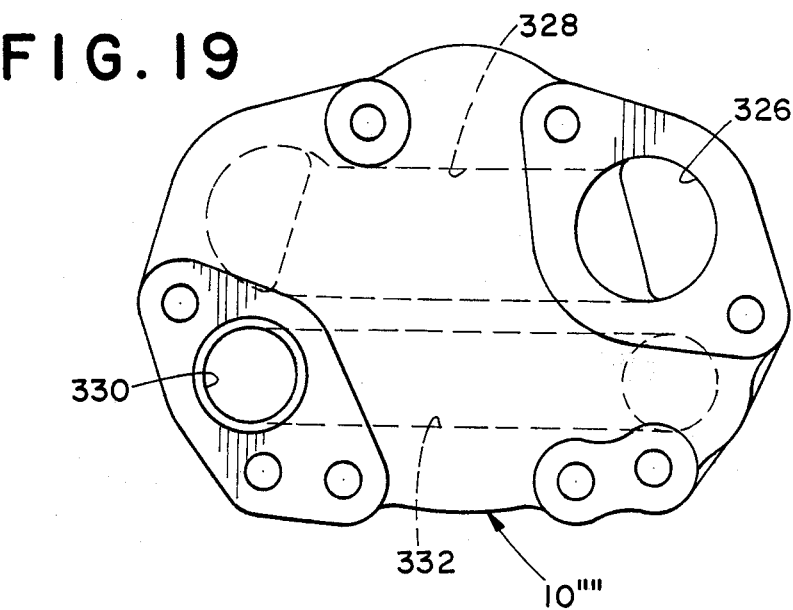

With reference now to the third preferred embodiment of the present invention as illustrated in FIGS. 18 and 19, the invention is there shown as being used in a low friction vaned compressor. For ease of illustration and appreciation of this alternative, like components are identified by like numerals with a quadruple primed ('''') suffix and new components are identified by new numerals.

In FIG. 18, a vaned compressor includes a vane member 22'''' adapted to oscillate in a chamber 20'''' provided in a body means 10''''. In this embodiment, sections of the body means can be made from a low weight sturdy plastic or ceramic material. The rest of the body means 10'''', including the walls of the chamber 20'''', and the vane 22'''' of the compressor can be made from a low friction ceramic material. The plastic material may be a resin containing polymers and copolymers of poly amide-imide and their derivatives. One suitable such plastic is manufactured by the Amoco Chemicals Corporation of Chicago, Ill. under the mark TORLON.

Friction contact between the vane 22'''' and the housing is confined to one or the other side of the boss of the vane, that is, to the area between the outer diameter of the boss and the shaft 30'''' since the actual length of the vane itself is preferably marginally shorter (by approximately 0.001 to 0.002 inches). The only other frictional contact is confined to the primary sealing area of the sealing grids within the housing. The arcuate component 14'''' of the body 10'''' and the axial end covers of the chamber 20'''', may be made from plastic or ceramic materials. These materials can, if necessary, be reinforced with mono or polycrystalline fibers. At least the rubbing surfaces of the vane and the sealing grids need to be wear resistant to ensure low-friction characteristics.

A suitable material for the body means 10'''' and the vane 22'' is a silicon-aluminum oxide-nitrogen semi-metallic ceramic material which is intended for applications where a combination of strength, toughness, wear resistance, and thermal shock resistance is demanded. One suitable such material is sold by Lucas Cookson Syalon Ltd. of Solihull-West Midlands, Great Britain under the mark SYALON. This material has high mechanical strength at room and elevated temperatures as well as high specific strength, a low co-effecient of friction resulting in good wear resistance as well as good abrasion and erosion resistance. Another advantage of this material is that it is less than half as dense as steel and thus the body means 10'''' and vane means 22'''' would weigh considerably less than if made from steel. The material also is chemically inert which results in a resistance to attack by various corrosive acids and the like. Moreover, the material is transparent to radar frequencies.

The thermal expansion, friction, and wear characteristics of SYALON are such that it may be possible to run the compressor without sealing grids, lubrication, or external cooling means. In this regard, if the rotary valve illustrated in FIG. 17A is made from a SYALON-like material, the sealing grid shown therein could also be eliminated thus further reducing friction losses.

Of course, the material of the sealing elements, whether it be cast iron, silicon, nitride, SYALON, TORLON, polytetraflouroethylene, or the like must be carefully matched to the material of the housing surfaces.

Also, in the embodiment of FIG. 18, yet a different type of valving mechanism is provided. In this embodiment the valve means include a pair of inlet valves 300, 302 and a pair of outlet valves 304, 306. The two inlet valves 300, 302 are mounted in the body means 10'''' and since they are identical, only the first of these will be discussed in detail, it being appreciated that the other valve has similar components.

The inlet valve 300 includes a valve plate 310 having a peripheral recess in which a seal member 312 is positioned, and a substantially centrally located transversely extending slot 314. The slot is closed by a valve 316 which is resiliently mounted on a suitable conventional spring member 318. The operation of this valve is accomplished by allowing inlet air into the valve chamber 20'''' when the pressure in the chamber is lower than atmospheric pressure. Under these circumstances, atmospheric air will push the valve 316 away from the valve plate 310 thereby allowing air into the chamber 22'''' through apertures 320, 322 in the body means 10''''. Exhaust of pressurized fluid past the inlet valve is impossible because as pressure builds up behind the valve 314, it will be pushed with greater force against the valve plate 310, thereby forming a seal and preventing any return flow of pressurized fluid through the inlet valve.

Although two inlet valves 300, 302 are illustrated, only one inlet orifice 326 need be provided for the body means 10'''' since an enclosed passageway 328 can extend from the inlet orifice 326 to the second inlet valve 302. Similarly, although two outlet valves 304, 306 are positioned on either side of the chamber 20'''', only one outlet orifice 330 need be provided on the body means 10''''. Again the pressurized fluid from the first outlet valve 304 is vented through an enclosed passage way 332 and the body means 10'''' to the outlet orifice 330.

The two outlet valves 304, 306 are identical and therefore only the latter of these will be described in detail, it being appreciated that the former has identical components. The discharge valve 306 includes a guide plate 340 which is forced into sealing contact with the surface 342 by receiver pressure or a light spring 344. When the compression pressure in the chamber 20'''' exceedes the combined spring and receiver pressure, the discharge valve plate 340 will be lifted off surface 342 and pressurized fluid will flow from chamber 20'''' into the porting leading to the receiver (not shown). On the other hand, when the receiver ressure is higher than the pressure within the chamber 20'''' the valve will then be urged in to sealing contact with the surface 342 thereby preventing any return flow into the chamber. In this embodiment, the valve plate 310 as well as the valves 306 and 314 and the guide plate 344 may all be made from SYALON or Silicon Nitride, or the like. Springs 318 and 344 are preferably completely encapsulated in heat resistant plastic to prevent any direct contact between the passing fluid and the metal of the springs.

Varying embodiments of the present invention are possible and the oscillating vane device can be designed to be competitive with any conventional positive displacement compressor. Indeed, effective valve opening cross sections encourage higher performance and speed levels than those customarily achieved by conventional air and refrigerant compressors, not to mention those incorporated in pneumatic (rail and road) vehicle breaking systems, and general purpose low and high pressure compressors in both large and miniture sizes.

One contemplated use of the invention is in a two-stroke oscillating vane engine. Such an engine would preferably use rotary valves (such as are illustrated in FIGS. 9, 14, 15, 16, and 17), although poppet valves are also feasible, and a pressurized mixture of air would need to be fed into the engine.

It should also be recognized that although only single vaned devices are illustrated in the drawings herein, multi-vaned devices could also be readily constructed. Multi-vane configurations and/or multi-bank designs could rely upon driving arrangements and valve actuation mechanisms known and developed in connection with radial aircraft engines.

The present invention thus provides for an oscillating vane apparatus for pressurizing fluids in either a compressor environment or an engine environment. At least one oscillating vane is positioned in a chamber of a housing and propulsion means are provided for oscillating the at least one vane to pressurize a fluid in the chamber. Valve means are secured to the housing and are in fluid communication with the housing chamber to control the movement of fluid into and out of the chamber. Preferably, counterweight means are operably secured to the oscillating vane and move in opposition to the movement of the vane to minimize the vibration produced in the housing by the oscillation of the vane. The valve means may include rotary inlet and outlet valves or stationary valves.

Preferably, all rubbing surfaces between the vane and the housing, including the sealing groups should ensure minimal frictional losses. Housing materials and surface coatings or treatments should therefore be carefully matched to the material of the sealing elements. Furthermore, when the relevant housing components and the vane are made from low expansion, low friction materials, such as ceramics, it may be practicable to dispense with lubrication and possibly with sealing grids.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. Apparatus for pressurizing a fluid, comprising:
a housing having a chamber therein;
at least one vane positioned in said chamber and adapted to oscillate therein to pressurize a fluid;

a seal means secured to said at least one vane for sealing between said at least one vane and said chamber;

propulsion means for oscillating said at least one vane;

counter-oscillating means operably secured to said propulsion means and moving in opposition to a movement of said at least one vane to minimize a vibration produced in said housing by an oscillation of said at least one vane, wherein said propulsion means comprises a shaft to which said at least one vane is secured and wherein said counter-oscillating means comprises a counterweight which is rotatably mounted on said shaft; and, valve means secured to said housing and in fluid communication with said housing chamber to control a movement of fluid into and out of said chamber.

2. The apparatus of claim 1 wherein said propulsion means includes:
a motor;
a rocker shaft secured at a first end to said at least one vane; and
a crankshaft operably secured on a first end to said motor and on a second end to a second end of said rocker shaft.

3. The apparatus of claim 1 wherein said valve means includes at least one inlet valve, for allowing a selective intake of a relatively unpressurized fluid into said chamber in said housing, and at least one outlet valve, for allowing a selective exhaust of a relatively pressurized fluid from said chamber in said housing.

4. The apparatus of claim 3 wherein said at least one inlet valve and said at least one outlet valve are both stationary valves having movable sections which respond to fluid pressure for opening and closing said valves.

5. The apparatus of claim 1 wherein said valve means includes at least one rotary valve which is rotated to allow a relatively unpressurized fluid into said chamber and to allow a relatively pressurized fluid out of said chamber.

6. The apparatus of claim 1 further comprising cooling means for cooling said at least one vane.

7. The apparatus of claim 6 wherein said cooling means comprises:
an interior passage provided in a rocker shaft secured at one end to said at least one vane;
a cooling chamber provided in said vane; and,
a pump means in fluid communication with said interior passage and said cooling chamber for moving a cooling fluid through said cooling chamber to cool said at least one vane.

8. The apparatus of claim 1 wherein said seal means includes a sealing grid comprising at least one apex seal, at least one pair of side seals and at least one base seal, said sealing grid completely sealing between said grid and respective walls of said chamber as well as between said grid and said vane.

9. The apparatus of claim 8 wherein said seal means further includes a spring means for urging the sealing grid into contact with respective walls of said chamber.

10. The apparatus of claim 1 wherein said oscillating vane pressurizes a fluid so that the apparatus can function as a compressor.

11. The apparatus of claim 1 further comprising a spark plug and wherein said oscillating vane inducts, compresses, expands, and exhausts a combustible fluid which is ignited by said spark plug thus enabling the apparatus to function as an engine.

12. The apparatus of claim 11 wherein said valve means includes cam operated poppet inlet and exhaust valves.

13. An oscillating vane compressor for pressurizing fluids, comprising:
a housing having a chamber therein, said chamber having surfaces, the surfaces of said chamber being made from a low friction material;
a vane positioned in said housing chamber and adapted to oscillate therein to pressurize a fluid, said vane being made from a low friction material so that a minimum of friction is generated as said vane oscillates in said chamber;
a propulsion means for oscillating said vane, said propulsion means comprising a shaft;
a counterweight operatively connected to said propulsion means and moving in opposition to a movement of said vane to minimize a vibration of said vane, said counterweight means being rotatably mounted on said shaft;
an inlet valve secured to said housing for allowing selective intake of a relatively unpressurized fluid into said chamber in said housing; and,
an outlet valve secured to said housing for allowing selective exhaust of a relatively pressurized fluid from said chamber in said housing.

14. The compressor of claim 13 wherein said propulsion means comprises:
a motor for driving said vane;
a crankshaft secured at a first end to said motor; and
a rocker shaft linked to said crankshaft by a connecting rod and a rocking lever to oscillate said vane.

15. The compressor of claim 13 wherein said inlet and outlet valves are both stationary valves having movable sections which respond to air pressure to open and close said valves.

16. The compressor of claim 13 wherein said inlet and outlet valves are both rotary valves which are rotated to draw fluid into said chamber and to allow fluid out of said chamber.

17. The compressor of claim 13 wherein said oscillating vane causes a pressure rise of at least 15 PSIa in said chamber.

18. Apparatus for pressurizing a fluid, comprising:
a housing including a chamber having walls;
a vane positioned in said chamber and adapted to oscillate therein to pressurize a fluid;
a first sealing grid means for completely sealing between said grid and the walls of said chamber as well as between said grid and said vane, said first sealing grid means including at least one apex seal, at least one pair of side seals and at least one base seal;
a first groove means provided in said vane for housing said first sealing grid means, wherein said first groove means comprises individual grooves located in a top wall of said vane, a pair of side walls of said vane and a base wall of said vane along a common plane, wherein said grooves are wider than said first sealing grid means to enable gas pressure to push said first sealing grid means towards a lower pressure side edge of said first groove means and towards said chamber walls;
propulsion means for oscillating said at least one vane; and, valve means secured to said housing and in fluid communication with said housing chamber to control a movement of fluid into and out of said chamber.

19. The apparatus of claim 18 further comprising a counterweight operably secured to said propulsion means and moving in opposition to the movement of said vane in order to minimize a vibration produced in said housing by an oscillation of said vane.

20. The apparatus of claim 19 wherein said propulsion means includes:
   a motor for driving said vane;
   a crankshaft secured at a first end to said motor; and
   a rocker shaft secured at a first end to said crankshaft and at a second end to said vane.

21. The apparatus of claim 18 wherein said valve means includes:
   a fluid into said chamber at a relatively lower pressure; and,
   an outlet valve for allowing a selective exhaust of said fluid, at a relatively higher pressure, from said chamber.

22. The apparatus of claim 18 further comprising resilient means for urging said first sealing grid means away from said groove means and towards said housing walls.

23. The apparatus of claim 18 wherein each of said apex, base, and side seals is a separate planar seal member and further comprising a resilient seal joint means for connecting said planar seal members together such that each of said planar seal members can move transversely in relation to others of said planar seal members while still remaining substantially parallel to said groove means.

24. The apparatus of claim 18 further comprising:
   a second sealing grid means for completely sealing between said grid and the walls of said chamber as well as between said grid and said vane, said second sealing grid means including an apex seal, a pair of side seals and a base seal, said second sealing grid means being spaced from said first sealing grid means; and,
   a second groove means provided in said vane for housing said sealing grid means, wherein said second groove means comprises individual grooves located in a top wall of said vane, a pair of side walls of said vane and a base wall of said vane, wherein said second groove means grooves are wider than said second sealing grid means seals to enable gas pressure to push said second sealing grid means toward a lower pressure side edge of said second groove means.

25. The apparatus of claim 24 further comprising a means for developing a pressure gradient between said first and second sealing grid means.

26. The apparatus of claim 25 wherein said means for developing a pressure gradient comprises an aperture extending longitudinally through said vane from one side edge thereof to another side edge thereof, said aperture being located between said first and second sealing grid means and wherein said aperture communicates with an oil sump.

27. The apparatus of claim 1 wherein said counter oscillating means further comprises a link member having a first end and a second end, a first end of said link member being operably secured to a crankshaft of said propulsion means and a second end of said link member being secured to said counterweight.

28. The apparatus of claim 27 further comprising a balance mass operatively connected to said crankshaft.

29. The apparatus of claim 28 wherein said balance mass is directly secured to said crankshaft.

* * * * *